United States Patent [19]
Masuda et al.

[11] 3,860,543
[45] Jan. 14, 1975

[54] HOT-MELT COMPOSITIONS
[75] Inventors: Koichiro Masuda, Yamaguchi;
Katsuhiko Tasaka, Tokyo, both of
Japan
[73] Assignee: **Mitsui Petrochemical Industries,
Ltd.,** Tokyo, Japan
[22] Filed: June 25, 1973
[21] Appl. No.: 373,224

[52] U.S. Cl............... 260/28.5 AV, 260/23.5 R,
260/23.7 R, 260/27 R, 260/27 EV,
260/28.5 A, 260/31.6 M, 260/45.95,
260/82, 260/889, 260/897 A, 260/897 B
[51] Int. Cl........................................... C08f 45/52
[58] Field of Search............... 260/897, 28.5 AV, 82

[56] References Cited
UNITED STATES PATENTS
3,245,931  4/1966  Matthew........................... 260/28.5
3,318,977  5/1967  Battersby et al................... 260/897
3,577,372  5/1971  Flanagan et al..................... 260/23

Primary Examiner—Murray Tillman
Assistant Examiner—C. J. Seccuro
Attorney, Agent, or Firm—Sughrue, Rothwell, Mion, Zinn & Macpeak

[57] ABSTRACT

This invention relates to hot-melt compositions for adhesives and coating agents which comprise a polyolefin selected from the group consisting of ethylene-vinyl acetate copolymers and amorphous polypropylenes and a petroleum resin which is produced from fractions selected from $C_4$–$C_5$ fractions having a $-15°$ to $45°C$ boiling point obtained by cracking or reforming, in combination with an aromatic hydrocarbon fraction having a high degree of unsaturation and a boiling point in the range of $145°$ to $280°C$.

25 Claims, No Drawings

HOT-MELT COMPOSITIONS

BACKGROUND OF THE INVENTION

1. Field of the invention

The present invention relates to hot-melt compositions for use as adhesives and coating agents.

2. Description of the Prior Art

Hitherto, compositions prepared by mixing polyolefins, tackiness providing resins such as rosin type resins, terpene resins and alkyl phenol resins, and, if desired, fillers, plasticizers and waxes, have been used in the field of bookbinding, can manufacturing, case making, paper bag making, woodworking, laminating, sealing, coating, etc.

Instead of the rosin type resins, petroleum synthetic resins, particularly aromatic hydrocarbon resins, which are generally called petroleum resins, and aliphatic hydrocarbon resins, etc., have been synthesized and utilized. However, resins which have properties as good as those of the rosin type resins in the field of hot-melt coating agents and adhesives have not yet been produced from petroleum hydrocarbon resins.

Advantages of the rosin type resins in hot-melt coating agents and adhesives are that they have good compatibility with polyolefins as the base component and plasticizers and waxes as additives, they serve to improve the ease of processing the compositions by controlling the viscosity of compositions, they have a good color and good heat stability, emit lowered amounts of bad odors and they have many qualities such as a good coatability, adhesiveness, gas impermeability, etc.

The petroleum resins generally have poor compatibility with polyolefins, or they are difficult to process because of their high melt viscosity. Further, they emit a strong, distasteful odor which lowers the commercial value of products produced therefrom. Resins having a poor compatibility with polyolefins have poor flexibility and poor plasticity at normal temperature or at low temperature, and have poor adhesion. On the other hand, the rosin type resins have excellent processability and excellent adhesiveness because of having good compatibility and a low melt viscosity, but they have poor heat stability and poor weather-resistance. Accordingly, the present invention provides materials for hot-melt compositions in which the above problems of hot-melt compositions have been improved.

The present inventors have found that the above problems are caused by the base component (polyolefins, etc.) or the incorporation of waxes and plasticizers.

Thus the inventors prepared excellent hot-melt compositions by selecting fractions suitable as the raw oil and producing a petroleum resin suitable as a hot-melt composition from the selected fractions.

SUMMARY OF THE INVENTION

In more detail, the present invention relates to hot-melt compositions which are produced by mixing a petroleum resin (C) and an ethylene-vinyl acetate copolymer having a 15 –40% by weight vinyl acetate content (melt index: 2.5 –200) and/or an amorphous polypropylene (D) in a ratio by weight of C/D = 50/100 –200/50, adding, if desired, a wax of a 40° to 80°C SP* and fusing the mixture by heating, wherein the petroleum resin (C) is produced by mixing fractions selected from $C_4$–$C_5$ fractions (A) having a −15° to 45°C boiling point obtained by the reforming or cracking of petroleum and an aromatic hydrocarbon fraction (B) having a high degree of unsaturation and a boiling point in the range of 145° to 280°C, that is, an unsaturated aromatic hydrocarbon fraction prepared by separating lower olefins, i.e., those having from 2 to 7 carbon atoms, benzene, toluene and xylene from petroleum cracking oils in a ratio by weight of A/B = 5/100– 80/100, and polymerizing the mixture using a Friedel-Crafts catalyst. (* Softening point will sometimes be abbreviated SP.)

DESCRIPTION OF THE PREFERRED EMBODIMENTS

The low boiling fraction (A) used in the present invention is a $C_4$–$C_5$ fraction which is obtained as a by-product at the cracking or reforming of petroleum, and has a boiling point in a range of from −15° to 45°C.

Generally, a heavy petroleum fraction such as light naphtha, heavy naphtha, gas oil, etc., may be cracked in a short time and under a comparatively low pressure in the presence of steam at a temperature of 500°C to 900°C. Hydrocarbons derived from such a steam cracking process usually consist of a considerably large amount of diolfins, olefins, aromatic hydrocarbons and some paraffins. See U.S. Pat. No. 3,379,663 for typical useful cracking conditions. Reforming, as is well known in the art, is a process applied to low octane number light oils obtained by the distillation of crude oils. While thermal reforming or contact reforming can be used, in general contact reforming is utilized. For example, hydro-reforming can be used where a low octane number light oil is reformed in a fluidized bed in the presence of molybdenum-oxide-alumina or chromium oxide-alumina as a catalyst at 12 to 15 atmospheres and at 430° to 500°C. Plat reforming can also be used, generally carried out on a fixed bed at 40 to 60 atmospheres at 450° to 550°C using platinum on an alumina carrier as a catalyst.

The procedures of cracking or reforming are well known in the art, and it shall be clearly understood by those skilled in the art that the exact cracking or reforming procedure used to obtain the starting components of the present invention is not limited in any manner.

The hydrocarbon fraction (A) having a boiling point in a range of from −15° to 45°C comprises a major proportion (more than 50% by weight) by weight of $C_4$ and $C_5$ olefins and diolefins such as 1-butene, 2-butene, isobutene, butadiene, 1-pentene, 2-pentene, cyclopentene, 1,3-piperylene, isoprene, cyclopentadiene, 2-methyl-1-butene, 2-methyl-2-butene and 3-methyl-1-butene, and, for example, has the following composition.

| | Percent by weight |
|---|---|
| $C_4$–$C_5$ Olefins | 40 – 70 |
| $C_4$–$C_5$ Diolefins | 20 – 60 |
| $C_4$–$C_5$ Paraffins (for example, butane, pentane, cyclopentane, etc.) | 10 – 30 |
| Others | 0 – 5 |

In the present invention, not only can such a $C_4$ – $C_5$ mixed fraction but also a $C_4$ fraction having a boiling point of −15° to 15°C, and containing butene and butadiene as the main components (at least 50% by weight butene and butadiene), a $C_5$ fraction, a $C_4$–$C_5$ mixed fraction after diolefin removal, and a $C_4$ fraction after butadiene removal can be used as the component (A).

For example, a $C_4$–$C_5$ fraction having a boiling point of $-15°$ to $15°C$ would typically contain 40 to 70% of $C_4$ olefins such as butenes (iso-butene, 1-butene, trans and cis 2-butenes), 20–45% butadiene, $C_4$ paraffins such as n-butane and iso-butane in an amount of 1–8% and hydrocarbons with less than 3 carbon atoms in an amount of 0–3%.

A typical $C_5$ fraction as described above would comprise a variety of $C_5$ olefins and diolefins, for instance, 5–25% pentenes (1-pentene, 2-pentene), 5–15% 2-methyl-1-butene and 1–10 % 2-methyl-2-butene, 4–16% 1,3-pentadiene, 0–10% cyclopentadiene and 5–20% isoprene. Other components which would typically be encountered in such a $C_5$ fraction would be minor proportions of $C_4$ to $C_5$ paraffins, for instance, 5 to 25% thereof, and component such as $C_4$ and $C_6$ olefins and paraffins, for instance, on the order of 0 to 5%.

It will be apparent to one skilled in the art that the above typical fractions are merely exemplary of fractions as can be used in the present invention, but these will provide a good guideline to one skilled in the art as to the commonly encountered components of such systems.

Referring to the $C_4$–$C_5$ mixed fraction after diolefin removal which was mentioned above, the composition thereof is not greatly limited, and, for example, a typical refinery stream which would be subjected to diene extracting would be

| | |
|---|---|
| $C_4$ to $C_5$ olefins | 50 – 90%, |
| $C_4$ to $C_5$ diolefins | 0 – 5%, |
| $C_4$ to $C_5$ paraffins | 15 ~ 40% and |
| others | 0 ~ 5%, | which, after diene extracting, would comprise

| | |
|---|---|
| butene | 35 ~ 65%, |
| pentene | 5 ~ 15%, |
| cyclopentene | 3 ~ 8%, |
| 2-methyl-1-butene | 3 ~ 12%, |
| 2-methyl-2-butene | 3 ~ 9%, |
| $C_4$ to $C_5$ paraffins | 15 ~ 40% and |
| others | 0 ~ 5%. |

The $C_4$ fraction referred to above as undergoing butadiene removal is, essentially, the $C_4$ fraction having a boiling point of $-15°$ to $15°C$ which contains butene and butadiene as the main components which has been subjected to butadiene removal.

A typical formulation of such a fraction after butadiene removal would be, for example,

| | |
|---|---|
| hydrocarbons of below 3 carbon atoms | 0 ~ 2%, |
| iso-butane and n-butane | 3 ~ 12%, |
| 1-butene | 20 ~ 33%, |
| isobutene | 35 ~ 50%, |
| trans and cis 2-butenes | 12 ~ 28% and |
| 1,3-butadiene | 0 ~ 2%. |

Specific examples of an actual $C_5$ and a $C_4$–$C_5$ fraction composition as obtained are illustrated below:

| | $C_5$ Fraction Composition |
|---|---|
| 1-pentene | 4.8% |
| 1,3-pentadiene | 9.1 |
| 2-methyl-1-butene | 7.2 |
| cyclopentadiene | 9.3 |
| 2-pentene | 4.9 |
| 3-methyl-1-butene + isopentane | 12.0 |
| 2-methyl-2-butene | 3.5 |
| isoprene | 14.7 |
| others | 34.5 |

| | $C_4$–$C_5$ Fraction Composition |
|---|---|
| butene | 20 – 50% by weight |
| butadiene | 10 – 30 |
| pentene | 1 – 10 |
| cyclopentene | 1 – 3 |
| cyclopentadiene | 2 – 8 |
| isoprene | 2 – 10 |
| 2-methyl-1-butene | 1 – 7 |
| 2-methyl-2-butene | 1 – 5 |
| 1,3-piperylene | 1 – 8 |
| $C_4$ to $C_5$ paraffins | 10 – 25 |

Of these fractions, it is particularly preferred to use residual oil having a 1,3-butadiene content below 2% as described above which is produced by extracting 1,3-butadiene, etc., from $C_4$ fractions having a $-15°$ to $15°C$ boiling point as defined and comprising a major proportion by weight of $C_4$ unsaturated hydrocarbons (any proportion greater than 50%). The polymerizable components of such a $C_4$ fraction after extracting diolefins are butene and isobutene.

The aromatic hydrocarbon (B) fraction having a boiling point in the range of $145°$ to $280°C$ contain a large amount of cyclic unsaturated hydrocarbons, for example, on the order of 30 to 60% by weight of aromatic unsaturated hydrocarbons. This fraction can be viwed as a vinyl aromatic compound containing stream which most preferably contains styrene, indene, or $C_8$ to $C_{12}$ derivatives thereof, most preferably styrene, indene, $\alpha$-methyl styrene, $\beta$-methyl styrene, methylidene, vinyl toluene and the like. Such a stream is produced by removing lower olefins, for example, the 2 to 7 carbon atom olefins, aromatic hydrocarbons such as benzene, toluene and xylene, and higher boiling fractions (for example, boiling at $280°$ to $300°C$) from hydrocarbon oils obtained by cracking (see U.S. Pat. No. 3,379,663) petroleum. Most preferred of the aromatic hydrocarbon fractions as described above are those having a bromine value of 60 to 90, preferably 70 to 80, and which contain 30 to 60% weight of vinyl aromatic hydrocarbons having 8 to 11 carbon atoms.

This fraction having a boiling point of $145°$ –$280°C$ has substantially the following composition.

| | Percent by weight |
|---|---|
| Styrene, indene and derivatives thereof | 30 – 60 |
| Olefins | 5 – 10 |
| Aromatics | 20 – 40 |
| Paraffins and naphthenes | 10 – 20 |
| Diolefins | 0 – 5 |

In the above table, typical of the olefins are aliphatic mono-olefins of 9 to 12 carbon atoms. Typical of the aromatics are $C_9$ to $C_{11}$ alkylbenzenes (main component), indene and $C_9$ to $C_{11}$ derivatives thereof with traces of benzene, toluene and xylene, and typical of the paraffins are the aliphatic paraffins of 9 to 12 carbon atoms.

The vinyl aromatic polymer component of such a stream would typically be, for example:

| | |
|---|---|
| vinyl toluene | 20 ~ 40% |
| indene | |
| styrene | |
| α-methylstyrene | 10 ~ 20% |
| methylidene | |
| β-methylstyrene | |

The polymerization of the mixed raw oil is carried out according to the process for producing petroleum resins in which a Friedel-Crafts catalyst is used. Namely, the petroleum resin can be produced by mixing a fraction selected from $C_4$ and $C_5$ fractions (A) and the unsaturated aromatic hydrocarbon fraction (B) in a ratio by weight of A/B = 5/100–80/100 to produce a raw oil, adding a Friedel-Crafts catalyst such as aluminium trichloride, aluminium tribromide, boron trifluoride, titanium tetrachloride, a boron trifluoride complex, for example, boron trifluoridephenol complex, to the raw oil in an amount of 0.5–2.0% by weight, reacting at −10°–40°C for 2–4 hours, removing the catalyst by decomposition, and removing unsaturated substances and low reaction products by distillation, etc. The pressure of the reaction is not overly important and the reaction can be conducted at reduced pressure, normal pressure or at super atmospheric pressure. Generally speaking, reaction will be at 0.1 to 10 atmospheres, and in few instances will there be any reason to run the reaction as other than atmospheric pressure, which is most preferred in the present invention. If the distillation referred to above is conducted at 170° to 200°C at 5mm Hg to 10mm Hg to remove unreacted monomers and low molecular weight reactants, a most highly preferred raw oil is obtained.

In the raw oil, which preferably has a bromine value of 70 to 120, if the ratio of A/B is outside the above described range, the compatibility of the resulting petroleum resin with the ethylene-vinyl acetate copolymer and/or the amorphous polypropylene becomes unsatisfactory. If the A/B ratio is below 5/100, the processability of the hot-melt composition deteriorates, while if the A/B ratio is above 80/100, its moisture resistance is poor. Particularly, in the present invention, a preferred A/B ratio range is 10/100–60/100.

The resulting petroleum resins are light yellow, thermoplastic resins having a 60°–130°C, preferably an 80°–120°C, softening point, a 10–50, preferably 15–40, bromine value and a 300–3000 average molecular weight, more preferably 500 to 800.

As the ethylene-vinyl acetate copolymer which is added to the petroleum resin for preparing the hot-melt compositions, those having a 15–40% by weight vinyl acetate content and a 2.5–200 melt index are used. These materials preferably have a density of 0.90 to 0.99, more preferably 0.93 to 0.97. The ethylene-vinyl acetate copolymer can be produced according to methods disclosed in U.S. Pat. Nos. 2,200,429 and 2,703,794.

As the amorphous polypropylene, waxy materials produced as by-products in the production of polypropylene which have a viscosity $[\eta] = 0.2–1.0$ are preferably used. So long as the polypropylene meets this criterion, it can be use with success in the present invention.

The ethylene vinyl acetate and amorphous polypropylene can be used as a mixture thereof, if desired.

The ethylene-vinyl acetate copolymer and/or the amorphous polypropylene (D) is mixed with the petroleum resin (C) in the range of C/D = 50/100–200/50, by weight.

Generally, many additives can be added to hot-melt compositions. Similarly, in the present invention, additives may be added to the compositions. Preferred additives include, for example, plasticizers such as dioctyl phthalate, dibutyl phthalate, dioctyl adipate, diisobutyl phthalate, dimethyl phthalate, etc., waxes having a 40° to 80°C softening point such as petroleum waxes and polyolefin waxes (most preferred of these two wax-materials are those having a molecular weight of from 300 to 700) and antioxidants such as phenol type or bisphenol type organic compounds and metal soaps, for example, 2,6-di-tert-butyl-4-methylphenol, styrenated phenol, 2,2'-methylene-bis-(6-tert-butyl-4-cresol), 4,4'-butylidene-bis-(6-tert-butyl-3-methyl phenol), calcium stearate, barium stearate, and the like.

The proportions of the above materials are not especially limited, and varying proportions can be used to achieve the well recognized function of these materials. However, typically, the plasticizer and antioxidant will each be used in an amount of 1 to 5%, if used, based on total composition weight.

When the hot-melt composition is mixed with the wax as an additive, the preferred mixing ratio of the petroleum resin (C), the ethylene-vinyl acetate copolymer and/or the amorphous polypropylene (D) and the wax is, in general, as follows:

| | Percent by weight |
|---|---|
| Petroleum Resin(C) | 20 to 60 |
| Ethylene-Vinyl Acetate Copolymer and/or Amorphous Polypropylene (D) | 20 to 60 |
| Wax | 10 to 50 |

In order to produce the hot-melt compositions using the petroleum resin, the ethylene-vinyl acetate copolymer and/or the amorphous polypropylene, and, if desired, other additives, the following various methods are exemplary. Namely, a homogeneous fused solution is produced by adding the ethylene-vinyl acetate copolymer and/or the amorphous polypropylene to a fused solution composed of the petroleum resin and, if desired, the wax and a plasticizer, and the mixture stirred with heating at a temperature of 140° to 180°C. For almost all compositions in accordance with the present invention the components are best mixed at 155° to 165°C. The solution is molded by cooling into granules, flakes, pellets, rods, etc., depending upon its use. Further, mixers, open mixing rolls and kneaders can also be used for melting with heating.

Upon use, the above described compositions can be utilized as an adhesive or coating merely by melting them again. For instance, in the case of coating, a curtain coater, etc., is used. In the case of adhesion, a rod composition is used by adding a welding gum so as to bind the corners of moldings.

In the hot-melt compositions of the present invention, the petroleum resins have, as earlier described, good compatibility with other components as compared with those produced using prior art petroleum resins. Namely, they not only have a low melt viscosity, good adhesiveness, and lesser offensive odor, but they also have good compatibility as compared with rosin or modified rosins which are similarly used. Further, they have a similar melt viscosity and adhesiveness to rosin or modified rosins. Particularly, they are preferred because they have less offensive odor.

Unless otherwise indicated, in the following examples all hue or color values are Gardner Color values (ASTM D-154-58).

EXAMPLE 1

100 g of a residual oil (shown in Table 1) which had been produced by extracting 1,3-butadiene from a $C_4$ fraction having a $-15°$ to 15°C boiling point range and containing unsaturated hydrocarbons was admixed with 300 g of a hydrocarbon oil (bromine value: 78) having a 145°–240°C boiling point range containing unsaturated hydrocarbons which had been produced at the cracking of petroleum.

After adding 3.6 g of boron trifluoride phenolate as the catalyst thereto, the mixture was allowed to polymerize at 35°C for 3 hours at atmospheric pressure. After washing with alkali and then with water, unreacted components were removed by vacuum distillation [the distillation was carried out at 5mm Hg at 180°C to remove unreacted paraffins and olefins, and low molecular weight polymers containing dimers and trimers] to produce a light yellow petroleum resin. Resin softening point: 80°C. Hue: 11. Bromine value: 18. Average molecular weight: 653.

TABLE 1

| Fraction | Raw fraction | | De-diene fraction* | |
|---|---|---|---|---|
| Below 3 carbons | 1% | by weight | 2% | by weight |
| Iso-butane | 1 | do. | 2 | do. |
| n-Butane | 2 | do. | 3 | do. |
| 1-Butene | 18 | do. | 28 | do. |
| Iso-butene | 28 | do. | 43 | do. |
| Trans-2-butene | 8 | do. | 12 | do. |
| Cis-2-butene | 6 | do. | 9 | do. |
| 1,3-Butadiene | 36 | do. | 1 | do. |
| | 100% | | 100% | |

*Fraction where butadiene had been removed from the original $C_4$ fraction.

The hydrocarbon oil of a bromine value of 78 in this example had a boiling point of 145° to 240°C and the following composition:

| | |
|---|---|
| 1) styrene, indene, other vinyl aromatic hydrocarbons of 8–12 carbon atoms; | 55% |
| 2) other aromatics | 37% |
| 3) olefins | 2% |
| 4) diolefins | less than 1% |
| 5) paraffins | 5% |

160 g of the resin prepared by the above mentioned process and 160 g of an ethylene-vinyl acetate copolymer (commercial name: Evaflex 220, vinyl acetate content: 28.5%, melt index: 164) were fused together with 80 g of a paraffin wax (softening point 145°F; average molecular weight of 630) as the additive in an oil bath at 160°C, and the fused mixture was stirred for 2 hours. The melt viscosity of the resulting hot-melt composition was measured by a B-type viscosimeter. The adhesive property was measured as follows. The composition was applied to a series of sheets of kraft paper by an automatic applicator so as to form a coating layer 20 $\mu$ thick. Then, the coated surfaces of two sheets of coated paper were adhered by a heat-sealing device. Conditions of the adhesion were as follows; temperature: 100°C, 120°C and 140°C, pressure: 1.33 Kg/cm², and time: 1 second.

The miscibility of the composition was determined by observing the compatibility of the pressed sheet of the composition having a 1 mm thickness at normal temperature and that of a fused solution at 160°C. The smell was determined by observing the odor of the above-described pressed sheet having a 1 mm thickness (at room temperature) and that of a fused solution at 130°C. The results are shown in Table 3.

COMPARISON EXAMPLE 1

3 g of boron trifluoride phenolate was added to 300 g of a hydrocarbon oil (bromine value: 78; same as was used in Example 1) containing unsaturated hydrocarbons and boiling in the range of 145°–240°C which had been produced by the cracking of petroleum. The mixture was allowed to polymerize at 35°C for 3 hours at atmospheric pressure. After washing the polymerized oil with alkali and then with water, unreacted components and low molecular weight reaction products were removed by vacuum distillation as in Example 1 to produce a light yellow petroleum resin. The petroleum resin had a softening point of 100°C, a bromine value of 17, an average molecular weight of 701 and a Hue of 12. Using this resin, a hot-melt composition was produced in the same manner as in Example 1. The results are shown in Table 3.

EXAMPLE 2

300 g of a fraction (bromine value: 78, same as hydrocarbon oil of Example 1) boiling in the range of 145°–240°C and 100 g of a fraction boiling in a range of $-15°$ to 45°C (see Table 2) which were obtained by the cracking of petroleum were mixed. After adding 4 g of boron trifluoride phenolate, the mixture was polymerized at 30°C for 3 hours at atmospheric pressure. The resulting polymerized oil (raw oil) was treated in the same manner as in Example 1 to produce a light yellow petroleum resin. The petroleum resin had softening point of 96°C, a bromine value of 34, an average molecular weight of 678 and a Hue of 10. A hot-melt composition was produced in the same manner as in Example 1. The results are shown in Table 3.

TABLE 2

| $C_4$ – $C_5$ fraction composition | |
|---|---|
| 1-butene | 10.6% |
| 2-butene | 9.6% |
| isobutene | 15.3% |
| 1,3-butadiene | 18.3% |
| 1-pentene | 2.6% |
| 2-pentene | 3.2% |
| cyclopentene | 2.1% |
| 1,3-piperylene | 3.0% |
| isoprene | 6.3% |
| cyclopentadiene | 4.7% |
| 2-methyl-1-butene | 3.7% |
| 2-methyl-2-butene | 2.1% |
| $C_4$–$C_5$ paraffins and other olefins (only trace amount of other olefins) | 18.5% |

EXAMPLE 3

300 g of a fraction (bromine value: 78; same as hydrocarbon oil in Example 1) boiling in the range of 145°–240°C and 100 g of a diene containing fraction boiling in the range of $-15°$ to 15°C (raw fraction described in Table 1) which were obtained from a hydrocarbon oil containing unsaturated hydrocarbons produced at the cracking of petroleum were mixed. After adding 4 g of boron trifluoride phenolate, the mixture was polymerized at 30°C for 3 hours at atmospheric pressure. The resulting polymerized oil was treated in the same manner as in Example 1 to produce a light yellow petroleum resin. The petroleum resin had softening point of 73°C, a bromine value of 32, an average molecular weight of 685 and a Hue of 10. A hot-melt composition was produced in the same manner as in Example 1. The results are shown in Table 3.

COMPARISON EXAMPLES 2 and 3

160 g of Rosin WW (ASTM D-509; Gardner Color 19.0) or 160 g of Ester gum H (hydrogenated product of glycerine ester of rosin, produced by Arakawa Rinsan Kagaku Kogyo K.K., yellow resin which has an acid value of less than 15 and a softening point greater than 68°C.) was used instead of the petroleum resin in Example 1. The results are shown in Table 3.

ing unsaturated hydrocarbons produced at the cracking of petroleum were mixed. After adding 4 g of boron trifluoride phenolate, the mixture was polymerized at 30°C for 3 hours at atmospheric pressure. The resulting polymerized oil was treated in the same manner as in Example 1 to produce a light yellow petroleum resin. The petroleum resin had a softening point of 96°C, a bromine value of 34 and a Hue of 10. A hot-melt composition was produced in the same manner as in Example 4. The results are shown in Table 4.

EXAMPLE 6

In this example, the exact procedures of Example 3 were followed except that amorphous polypropylene was used in place of the ethylene-vinyl acetate copolymer of Example 3. A brief summary is provided below. 300 g of a fraction (bromine value: 78) boiling in the range of 145° to 240°C and 100 g of diene containing fraction boiling in the range of −15° to 15°C (raw frac-

TABLE 3

| | Example 1 | Comparison 1 | Example 2 | Example 3 | Comparison 2 | Comparison 3 |
|---|---|---|---|---|---|---|
| Resin | Petroleum resin in Example 1 | Petroleum resin in Comparison 1 | Petroleum resin in Example 2 | Petroleum resin in Example 3 | Rosin WW | Ester gum H |
| Melt viscosity (CPS) | | | | | | |
| Temperature 120°C | 13000 | 14000 | 13100 | 11100 | 7900 | 7800 |
| 140°C | 6300 | 7200 | 6400 | 5600 | 5000 | 5100 |
| 160°C | 3000 | 4100 | 3200 | 3100 | 3200 | 3300 |
| Adhesive property g/25mm kraft paper Heat-sealing | | | | | | |
| Temperature 100°C | 1359 | 501 | 1260 | 1340 | 1704 | 1570 |
| 120°C | 1357 | 611 | 1310 | 1372 | 1624 | 1614 |
| 140°C | 1457 | 561 | 1395 | 1453 | 1858 | 1813 |
| Smell | | | | | | |
| (1) normal temperature, press-sheet | Very faint | Intensive | Faint | Very faint | Faint | Faint |
| (2) 130°C, fused solution | Very faint | Intensive | Faint | Very faint | Intensive | Faint |
| Compatibility | | | | | | |
| (1) normal temperature, press-sheet | Transparent | Opaque | Transparent | Transparent | Transparent | Transparent |
| (2) 160°C, fused solution | Transparent | Opaque | Transparent | Transparent | Transparent | Transparent |

EXAMPLE 4

A hot-melt composition was produced in the same manner as in Example 1 using 200 g of the petroleum resin obtained in Example 1, 120 g of an amorphous polypropylene (viscosity $[\eta] = 0.7$, softening point: 70°C) produced as a by-product in the production of polypropylene, and 80 g of paraffin wax (softening point: 145°F; average molecular weight: 630). The results are shown in Table 4.

EXAMPLE 5

In this example, the exact same procedures in Example 2 were followed except that amorphous polypropylene was used in place of the ethylene vinyl acetate copolymer of Example 2. The procedure is briefly summarized below. 300 g of a fraction (bromine value: 78) boiling in the range of 145°–240°C and 100 g of a diene containing fraction boiling in the range of −15° to 45°C which were obtained from a hydrocarbon oil containtion described in Table 1) which were obtained from a hydrocarbon oil containing unsaturated hydrocarbons produced at the cracking of petroleum were mixed. After adding 4 g of boron trifluoride phenolate, the mixture was polymerized at 30°C for 3 hours at atmospheric pressure. The resulting polymerized oil was treated in the same manner as in Example 1 to produce a light yellow petroleum resin. The petroleum resin had a softening point of 73°C, a bromine value of 32 and a hue of 10. A hot-melt composition was produced in the same manner as in Example 4. The results are shown in Table 4.

COMPARISON EXAMPLES 4–6

Instead of the petroleum resin used in Example 2, petroleum resins in Comparison Examples 1–3, Rosin WW and Ester gum H (used in Comparison 2 or 3) were used in an amount of 200 g, respectively. The results are shown in Table 4.

TABLE 4

|  | Example 4 | Comparison 4 | Example 5 | Example 6 | Comparison 5 | Comparison 6 |
|---|---|---|---|---|---|---|
| Resin | Petroleum resin in Example 4 | Petroleum resin in Comparison 4 | Petroleum resin in Example 5 | Petroleum resin in Example 6 | Rosin WW | Ester gum H |
| Melt viscosity (CPS) | | | | | | |
| Temperature 160°C | 13000 | 14100 | 12800 | 12300 | 12200 | 12100 |
| 180°C | 7100 | 8200 | 7200 | 6800 | 6700 | 6500 |
| 200°C | 5150 | 6200 | 5100 | 5200 | 4800 | 4900 |
| Adhesive property g/25mm kraft paper Heat-sealing | | | | | | |
| Temperature 120°C | 1210 | 750 | 1190 | 1205 | 1310 | 1570 |
| 140°C | 1340 | 610 | 1310 | 1320 | 1610 | 1610 |
| Smell | | | | | | |
| (1) normal temperature, pressed sheet | Very faint | Intensive | Very faint | Very faint | Faint | Faint |
| (2) 130°C, fused solution | Very faint | Intensive | Very faint | Very faint | Intensive | Faint |
| Compatibility | | | | | | |
| (1) normal temperature, pressed sheet | Transparent | Semi-Transparent | Transparent | Transparent | Transparent | Transparent |
| (2) 160°C, fused solution | Transparent | Semi-Transparent | Transparent | Transparent | Transparent | Transparent |

While the invention has been described in detail and with reference to specific embodiments thereof, it will be apparent to one skilled in the art that various changes and modifications can be made therein without departing from the spirit and scope thereof.

What is claimed is:

1. Hot-melt compositions which comprise:
   (C) a petroleum resin having a 60°–130°C softening point and a 10–50 bromine value; and
   (D) an ethylene-vinyl acetate copolymer (melt index: 2.5–200) containing 15–40% by weight of vinyl acetate, and/or an amorphous polypropylene, wherein the ratio by weight of (C) and (D) is C/D = 50/100–200/50;
   said petroleum resin being produced by polymerizing, in the presence of a Friedel-Crafts catalyst, a mixed raw oil obtained by a mixing a low boiling $C_4$–$C_5$ hydrocarbon fraction (A) having a boiling point of −15° to 45°C and comprising a major proportion by weight of $C_4$ and $C_5$ unsaturated hydrocarbons produced at the cracking or reforming of petroleum, and a hydrocarbon fraction (B) having a boiling point range in the range of 145°–280°C a bromine value of 60 to 90 and containing 30 to 60% by weight of vinyl aromatic hydrocarbons having 8 to 11 carbon atoms produced at the cracking or reforming of petroleum, in a ratio by weight of A/B = 5/100–80/100.

2. Compositions as set forth in claim 1 wherein the ratio by weight of components (A) and (B) is A/B = 10/100–60/100.

3. Compositions as set forth in claim 1 wherein the ethylene-vinyl acetate copolymer contains 20 to 35% by weight of vinyl acetate.

4. Compositions as set forth in claim 1 wherein the ratio by weight of components (C) and (D) is C/D = 35/50–150/50.

5. Compositions as set forth in claim 1 wherein component (A) is a $C_4$ fraction having a boiling point range of −15° to 15°C, and comprising a major proportion by weight of $C_4$ unsaturated hydrocarbons.

6. Compositions as set forth in claim 1 wherein component (B) is a fraction containing 30–60% by weight of styrene, indene or derivatives thereof.

7. Compositions as set forth in claim 6 wherein said derivatives of styrene or indene have 8 to 12 carbon atoms.

8. Compositions as set forth in claim 7 wherein said derivatives are selected from the group consisting of $\alpha$-methylstyrene, $\beta$-methylstyrene, methylindene and vinyl toluene.

9. Compositions as set forth in claim 1 wherein component (A) is a residual oil prepared by extracting dienes from a $C_4$ fraction having the boiling point range of −15° to 15°C, and component (A) comprises a major proportion by weight of $C_4$ unsaturated hydrocarbons and has a butadiene content of below 2% by weight.

10. Compositions as set forth in claim 1 wherein said mixed raw oil has a bromine value of from 70 to 120.

11. Compositions as set forth in claim 1 wherein said petroleum resin has a molecular weight of from 300 to 3,000.

12. Compositions as set forth in claim 11 wherein said petroleum resin has a molecular weight of from 500 to 800.

13. Compositions as set forth in claim 1 wherein said amorphous polypropylene has a viscosity [$\eta$] of from 0.2 to 1.0.

14. Compositions as set forth in claim 1 wherein said ethylene-vinyl acetate copolymer has a density of from 0.90 to 0.99.

15. Compositions as set forth in claim 1 wherein said polymerization is conducted in the presence of a Friedel-Crafts catalyst in an amount of 0.5 to 2.0% by weight, based on the mixed raw oil, at −10° to 40°C for 2 to 4 hours.

16. Hot-melt compositions which comprise:
   1. 20–60% by weight of (C) a petroleum resin having a 60°–130°C softening point and a 10–50 bromine value; and
   2. 20–60% by weight of (D) an ethylene-vinyl acetate copolymer (melt index: 2.5–200) containing 15–40% by weight of vinyl acetate and/or an amorphous polypropylene; and
   3. 10–50% by weight of a wax, said petroleum resin being produced by polymerizing, in the presence of a Friedel-Crafts catalyst, a mixed raw oil obtained by mixing a low boiling $C_4$–$C_5$ hydrocarbon fraction (A) having a boiling point of −15° to 45°C and comprising a major proportion by weight of $C_4$ and $C_5$ unsaturated hydrocarbons produced at the cracking or reforming of petroleum and a hydrocarbon fraction (B) having a boiling point range in the range of 145°–280°C, a bromine value of 60 to 90 and containing 30 to 60% by weight of vinyl aromatic hydrocarbons having 8 to 11 carbon atoms produced at cracking or reforming of petroleum, in a ratio by weight of A/B = 5/100–80/100.

17. Compositions as set forth in claim 16 wherein the wax is selected from petroleum waxes and polyolefin waxes having a 40° to 80°C softening point.

18. Compositions as set forth in claim 16 wherein said wax has a softening point of from 50° to 70°C.

19. Compositions as set forth in claim 16 wherein a plasticizer and an antioxidant are incorporated besides the petroleum resin component (C) and the ethylene-vinyl acetate copolymer and/or the amorphous polypropylene component (D).

20. Compositions as set forth in claim 19 wherein the plasticizer is selected from dioctyl phthalate and dibutyl phthalate.

21. Compositions as set forth in claim 19 wherein the antioxidant is selected from phenol type and bisphenol type organic compounds and metal soaps.

22. Compositions as set forth in claim 16 which comprise from 30 to 50% by weight of said petroleum resin (C).

23. Compositions as set forth in claim 16 which comprise from 30 to 50% by weight of said ethylene-vinyl acetate copolymer.

24. Compositions as set forth in claim 16 which comprise from 20 to 40% by weight of said wax.

25. Hot-melt compositions which comprise:
a mixture of (C) a petroleum resin having a 80°–120°C softening point and a 15–40 the bromine value; and
(D) an ethylene-vinyl copolymer (melt index 2.5–200) containing about 40% by weight vinyl acetate, wherein the ratio by weight of (C) and (D) is C/D = 50/100–200/50;
said petroleum resin being produced by polymerizing, in the presence of a boron trifluoride-phenol complex catalyst, a mixed raw oil obtained by mixing a residual oil (A) having a diene content below 2% which is produced by extracting dienes from a $C_4$ fraction having a −15° to 15°C boiling point produced at the cracking or reforming of petroleum and a hydrocarbon fraction (B) having a boiling range in the range of 145°–240°C and containing 30–60% of styrene, indene or derivatives thereof produced at the cracking or reforming of petroleum, in a ratio by weight of A/B = 10/100–60/100.

* * * * *